(12) United States Patent
Pearce et al.

(10) Patent No.: US 6,704,406 B1
(45) Date of Patent: Mar. 9, 2004

(54) AUTOMATED ROUTE PLAN GENERATION

(75) Inventors: Christopher E. Pearce, Dallas, TX (US); Rita L. Chow, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 344 days.

(21) Appl. No.: 09/867,795

(22) Filed: May 29, 2001

(51) Int. Cl.[7] .......................... H04M 7/00; H04L 12/28; H04L 12/56; H04L 12/66
(52) U.S. Cl. .................. 379/221.01; 370/352; 370/401; 370/495; 379/221.02; 379/221.05; 379/221.06; 379/221.14; 379/221.15; 379/901
(58) Field of Search ................................. 370/352, 353, 370/354, 401, 493, 494, 495; 379/219, 220.01, 221.01, 221.02, 221.05, 221.06, 221.14, 221.15, 901

(56) References Cited

U.S. PATENT DOCUMENTS

| 5,335,268 | A | * | 8/1994 | Kelly et al. | 379/112.05 |
|---|---|---|---|---|---|
| 5,590,188 | A | * | 12/1996 | Crockett | 379/265.02 |
| 5,734,709 | A | * | 3/1998 | DeWitt et al. | 379/221.5 |
| 5,812,654 | A | * | 9/1998 | Anderson et al. | 379/221.15 |
| 5,832,196 | A | * | 11/1998 | Croslin et al. | 714/4 |
| 5,982,869 | A | * | 11/1999 | Lozano et al. | 379/220.01 |
| 6,163,597 | A | * | 12/2000 | Voit | 379/93.17 |
| 6,298,126 | B1 | * | 10/2001 | Kawecki et al. | 379/126 |
| 6,314,092 | B1 | * | 11/2001 | Reeve | 370/351 |
| 6,377,677 | B1 | * | 4/2002 | Ackerley et al. | 379/279 |
| 6,404,864 | B1 | * | 6/2002 | Evslin et al. | 379/112.01 |
| 6,574,661 | B1 | * | 6/2003 | Delano et al. | 709/223 |
| 6,584,189 | B1 | * | 6/2003 | Hansen et al. | 379/221.02 |
| 6,614,781 | B1 | * | 9/2003 | Elliott et al. | 370/352 |

* cited by examiner

Primary Examiner—Harry S. Hong
(74) Attorney, Agent, or Firm—Baker Botts L.L.P.

(57) ABSTRACT

A communication system includes a tenant with multiple physical locations that include a number of packet enabled telecommunications devices managed by one or more call managers. To generate a route plan for use by a call manager in managing calls from these devices, a route plan wizard determines routing options, location information for the tenant, and gateway information for gateways available to the tenant and then automatically generates a route plan for use in routing telephone calls originating from the managed packet enabled telecommunications devices based on this information.

22 Claims, 10 Drawing Sheets

FIG. 4

Cisco CallManager Administration
For Cisco IP Telephony Solutions

External Route Plan Wizard
Location Entry

Enter the information related to each physical location. Use ';' to separate the local area codes used for the location. The dialing scheme is for North American Numbering Plan (NANP) only.
Note: Each location name must be unique. If the location name is currently being used for an existing route plan, please choose another name.

Location Entry 1:

Location name*  [Dallas]

Local Area Code(s)*  [972,214]
(Use ';' to separate the multiple entries: 972,214)

What is the telephone number of the main switchboard in this location?  [972] [813] [5000]

How many digits does it take to dial a local call in this location?
⊙ 10 digits
○ 7 digits
○ Metro (10 and 7 digits)

Location Entry 2:

Location name*  [SanJose]

Local Area Code(s)*  [408]
(Use ';' to separate the multiple entries: 972,214)

What is the telephone number of the main switchboard in this location?  [ ] [ ] [ ]

How many digits does it take to dial a local call in this location?
⊙ 10 digits
○ 7 digits
○ Metro (10 and 7 digits)

[Next]  [Cancel]     *indicates required item     [Next]  [Cancel]

FIG. 7B

FROM FIG. 7A

| Calling Search Space | Partition (by Order) |
|---|---|
| CiscoSanJoseLongDistPT | |
| CiscoSanJoseIntlPT | |
| CiscoDallas911OnlyCS | CiscoDallas911PT |
| CiscoDallasEnterpriseCS | CiscoDallas911PT<br>CiscoPT |
| CiscoDallasLocalCS | CiscoDallas911PT<br>CiscoPT<br>CiscoDallasLocalPT |
| CiscoDallasTollByPassCS | CiscoDallas911PT<br>CiscoPT<br>CiscoDallasLocalPT<br>CiscoTollByPassToSanJosePT |
| CiscoDallasLongDistCS | CiscoDallas911PT<br>CiscoPT<br>CiscoDallasLocalPT<br>CiscoTollByPassToSanJosePT<br>CiscoDallasLongDistPT |
| CiscoDallasIntlCS | CiscoDallas911PT<br>CiscoPT<br>CiscoDallasLocalPT<br>CiscoTollByPassToSanJosePT<br>CiscoDallasLongDistPT<br>CiscoDallasIntlPT |
| CiscoSanJose911OnlyCS | CiscoSanJose911PT |
| CiscoSanJoseEnterpriseCS | CiscoSanJose911PT<br>CiscoPT |
| CiscoSanJoseLocalCS | CiscoSanJose911PT |

FROM FIG. 7B

| | | |
|---|---|---|
| | CiscoPT | |
| | CiscoSanJoseLocalPT | |
| CiscoSanJoseTollByPassCS | CiscoSanJose911PT | |
| | CiscoPT | |
| | CiscoSanJoseLocalPT | |
| | CiscoTollByPassToDallasPT | |
| CiscoSanJoseLongDistCS | CiscoSanJose911PT | |
| | CiscoPT | |
| | CiscoSanJoseLocalPT | |
| | CiscoTollByPassToDallasPT | |
| | CiscoSanJoseLongDistPT | |
| CiscoSanJoseIntlCS | CiscoSanJose911PT | |
| | CiscoPT | |
| | CiscoSanJoseLocalPT | |
| | CiscoTollByPassToDallasPT | |
| | CiscoSanJoseLongDistPT | |
| | CiscoSanJoseIntlPT | |
| Route List | Route Filter | |
| CiscoDallas911RL | 9.@ where (SERVICE == 911) | |
| CiscoDallasLocalRL | 9.@ where (LOCAL-AREA-CODE == 972) OR (LOCAL-AREA-CODE == 214) | |
| CiscoTollByPassToDallasRL | 9.@ where (AREA-CODE == 972) OR (AREA-CODE == 214) | |
| CiscoDallasLongDistRL | 9.@ where (AREA-CODE EXISTS) | |
| CiscoDallasIntlRL | 9.@ where (INTERNATIONAL-ACCESS EXISTS) | |

FROM FIG. 7C

| | |
|---|---|
| CiscoSanJose911RL | 9.@ where (SERVICE == 911) |
| CiscoSanJoseLocalRL | 9.@ where (LOCAL-AREA-CODE == 408) |
| CiscoTollByPassToSanJoseRL | 9.@ where (AREA-CODE == 408) |
| CiscoSanJoseLongDistRL | 9.@ where (AREA-CODE EXISTS) |
| CiscoSanJoseIntlRL | 9. @ where (INTERNATIONAL-ACCESS EXISTS) |
| Route Group | Gateway belonging to this routegroup |
| CiscoDallasMT1 | @S1/DS1-0@New.VG200.gateway |
| Route List | Route Group Member |
| CiscoDallas911RL | CiscoDallasMT1 |
| CiscoDallasLocalRL | CiscoDallasMT1 |
| CiscoTollByPassToDallasRL | CiscoDallasMT1 |
| CiscoDallasLongDistRt | CiscoDallasMT1 |
| CiscoDallasIntRL | CiscoDallasMT1 |

[Next]

AUTOMATED ROUTE PLAN GENERATION

TECHNICAL FIELD OF THE INVENTION

The present invention relates generally to packet enabled communication systems and, more particularly, to automated route plan generation.

BACKGROUND OF THE INVENTION

Historically, telecommunications involved the transmission of voice and fax signals over a network of dedicated telecommunications equipment, such as the public switched telephone network (PSTN) and private branch exchanges (PBXs). Similarly, data communications have historically taken place over dedicated data networks, such as a local area network (LAN) or a wide area network (WAN). However, technological advancements have led to a convergence of data communications and telecommunications using a shared network. Yet, systems exploiting the advantages resulting from this convergence often prove too complex for typical users to configure and manage.

SUMMARY OF THE INVENTION

In accordance with the present invention, techniques for automated route plan generation are provided that substantially eliminate or reduce disadvantages or problems associated with previous techniques. In a particular embodiment, the present invention satisfies a need for a user friendly, relatively easy to use system for generating route plans.

According to one embodiment of the present invention, a method for generating an external route plan receives routing options for a tenant having multiple physical locations and, for each of the physical locations, receives location information, with the location information having at least one area code and digit dialing requirements. The method presents multiple predefined gateways and receives selections indicating one or more of the gateways. For each of the selected gateways, the method receives gateway information that includes a carrier connection type and a location indicating a selected one of the physical locations. Based on the routing options, the location information, and the gateway information, the method generates a route plan that supports the routing of telephone calls from managed devices of the tenant.

Embodiments of the present invention provide various technical advantages. Using these techniques, a system administrator can generate a relatively complex routing plan without needing an in-depth understanding of the nuances of generating route plans. Moreover, because the system generates route plans automatically based upon basic criteria established by an administrator, the resulting dial plan may prove to be more accurate than comparable, manually configured route plans, even those generated by expert users.

Other technical advantages of the present invention will be readily apparent to one skilled in the art from the following figures, descriptions, and claims. Moreover, while specific advantages have been enumerated above, various embodiments may display all, some, or none of the enumerated advantages and may display other advantages.

BRIEF DESCRIPTION OF THE DRAWINGS

For a more complete understanding of the present invention and its advantages, reference is now made to the following description, taken in conjunction with the accompanying drawings, in which:

FIG. 4 illustrates an interface for obtaining information for physical locations of the tenant;

DETAILED DESCRIPTION OF THE DRAWINGS

Figure 1:
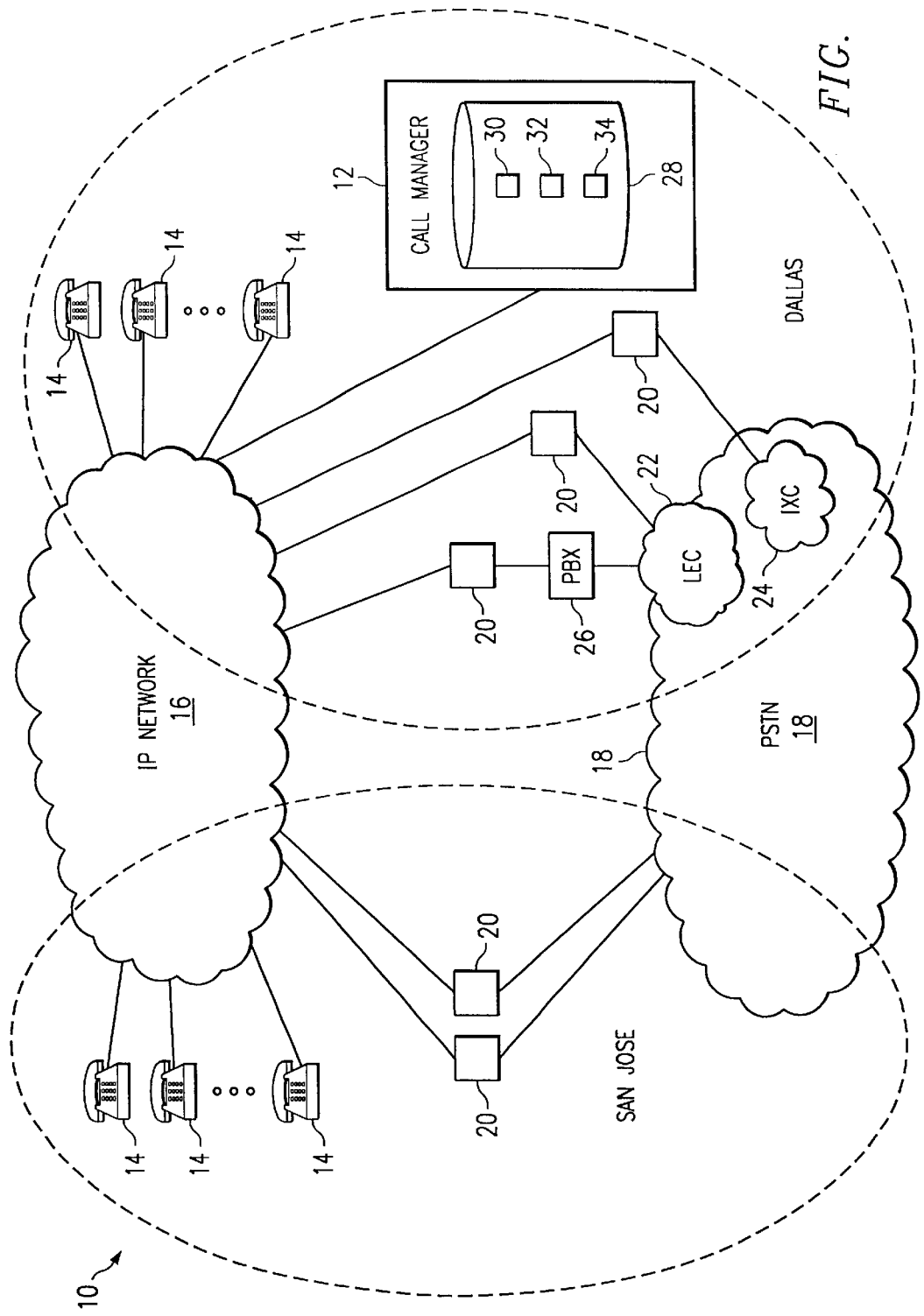
FIG. 1 illustrates a communication system having a call manager that uses a route plan to route telephone calls from managed telephony devices.

FIG. 1 illustrates a communication system, indicated generally at 10, that includes a call manager 12 responsible for routing calls for packet-enabled telephony communication devices 14 through various available networks, such as an Internet protocol (IP) network 16 and the public switched telephone network (PSTN) 18. In the example illustrated, call manager 12 manages telephony routing for devices 14 in multiple geographic locations, including San Jose and Dallas in this example. Within each geographical area, call manager 12 may use gateways 20 to route telephone calls between IP network 16 and other networks, such as PSTN 18. These gateways 20 may couple to various elements of PSTN 18, such as a local exchange carrier (LEC) 22 or an inter-exchange carrier (IXC) 24 and may couple to other types of networks such as a private branch exchange (PBX) 26. In general, call manager 12 controls the routing of telephone calls from devices 14 across IP network 16, through PSTN 18, or through other available communication networks.

To control routing of telephone calls involving devices 14, call manager 12 includes a memory 28 that maintains one or more route plans 30 detailing appropriate routing for telephone calls. Route plans 30 include information for routing calls and restricting access of users and groups of users to various services. For example, route plans 30 may control the access of selected devices 14 to services, such as access to external networks, long distance services, or international services. Moreover, route plans 30 control the routing of these calls, when permitted, to appropriate gateways 20 depending on conditions in various networks, such as IP network 16 and PSTN 18.

For example, consider device 14 in Dallas placing a telephone call to an external telecommunications device attached to PSTN 18 in San Jose. From a cost standpoint, call manager 12 would ideally route this call through IP network 16 to gateway 20 in San Jose for connection to the external device as a local telephone call. However, depending upon the availability of gateways 20, this route may not be available. Thus, if call manager 12 determines that no gateways 20 are available for the call in San Jose, call manager 12 may "fall back" to routing the call as a long distance telephone call across PSTN 18 through gateway 20 in Dallas. Therefore, route plans 30 may specify a series of gateways 20 for particular patterns of dialed digits to provide multiple potential paths for routing calls.

However, depending on the route used for a call, the calling party's digits and/or the called party's digits may be inappropriate. That is, many networks have specific requirements for the digits of the called and calling parties. Thus, in addition to controlling the routing of telephone calls to appropriate gateways 20, route plans 30 may also specify transformations to the called digits as well as the calling party's digits based on the routing decisions made. For example, if the telephone call from device 14 in Dallas routes through gateway 20 in San Jose, then call manager 12 may modify the dialed digits to remove any long distance access codes and/or the area code dialed by device 14 in Dallas, since the call placed from gateway 20 in San Jose through PSTN 18 to the external device is a local telephone call. Moreover, since PSTN 18 in San Jose may not recognize local calls originating from calling parties with an area code from Dallas, call manager 12 may also modify the calling party digits, for example, by replacing the calling party digits with a local switchboard number in San Jose.

According to a particular embodiment, selected route plans 30 include route lists, route groups, route patterns, and route filters. The route patterns enable call manger 12 to recognize dialed digits and then route a call. Moreover, a route pattern may specify a set of patterns, such as all valid patterns for the North American Numbering Plan (NANP). Route filters permit call manager 12 to restrict access to only specific patterns specified by route plan 30. For example, a route pattern indicating all valid NANP patterns may be restricted by a route filter that prohibits access to long distance or international numbers. Thus, using route patterns in conjunction with route filters, a selected route plan 30 may specify a number of different types of routing options for an administrator to later assign to particular users or groups of users.

Route plan 30 also provides routing actions for call manager 12 to take upon matching the route patterns. These actions may include routing any matching call to a device such as a particular gateway 20 or to a route group and/or route list. Route groups include multiple devices treated as a single gateway. For a call routing to a route group, the call is offered to each device in the route group before being rejected. Thus, according to a particular embodiment, a route group functions as an ordered list of gateways 20. Like a route group combines multiple gateways 20, a route list combines multiple route groups. Thus, a route list may function as an ordered list of route groups. Using route groups and route lists, route plan 30 can provide routing decisions designed to maximize the effectiveness and cost of telecommunications for a tenant.

For example, consider a first route group that includes gateways 20 in San Jose, a second route group that includes gateways 20 in Dallas, and a route list that includes the two route groups. Device 14 in Dallas with long distance access may be assigned access to the route list, with long distance calls to San Jose routing based on the route list. Thus, for a call from device 14 in Dallas to an external number in San Jose, the route list first specifies to attempt routing to the call to the route group of San Jose gateways 20 as a local call with fallback to the route group of Dallas gateways 20 as a long distance call.

Moreover, these route plans 30 may further include partitions and calling search spaces. Partitions serve as directories containing a group of patterns and/or numbers, while search spaces identify particular partitions to search upon receiving a call. Thus, the numbers for selected devices 14 may be assigned to a partition, with those devices accessible only to calls from devices 14 assigned to a search space that includes that partition. Thus, partitions and search spaces separate groups of numbers and provide access to selected groups of numbers.

As evidenced by the relatively simple example illustrated, route plans 30 for even small organizations may require complex routing information in order to be effective. Generating these route plans 30 typically requires administrators with extensive training, a thorough understanding of available routing options, and armed with business rules for the organization. However, due to inexperience, errors, and other factors, route plans 30 generated by these system administrators or "experts" may be incomplete, inaccurate, inefficient, and/or unusable. Thus, to simplify this process, call manager 12 includes a route plan wizard 32 that, through a series of interfaces, elicits information from an administrator and then uses this information to automatically generate one or more route plans 30. According to a particular embodiment, route plan wizard 32 gathers information and generates route plan 30 for use in routing calls placed from devices 14 to other devices 14 and to external numbers. To aid route plan wizard 32 in generating route plans 30, call manager 12 includes configuration data 34 for use in presenting options and transforming information received from an administrator into route plans 30. For example, configuration data 34 may include information describing available gateways 20 for routing information from IP network 16 to other networks.

Figure 2:
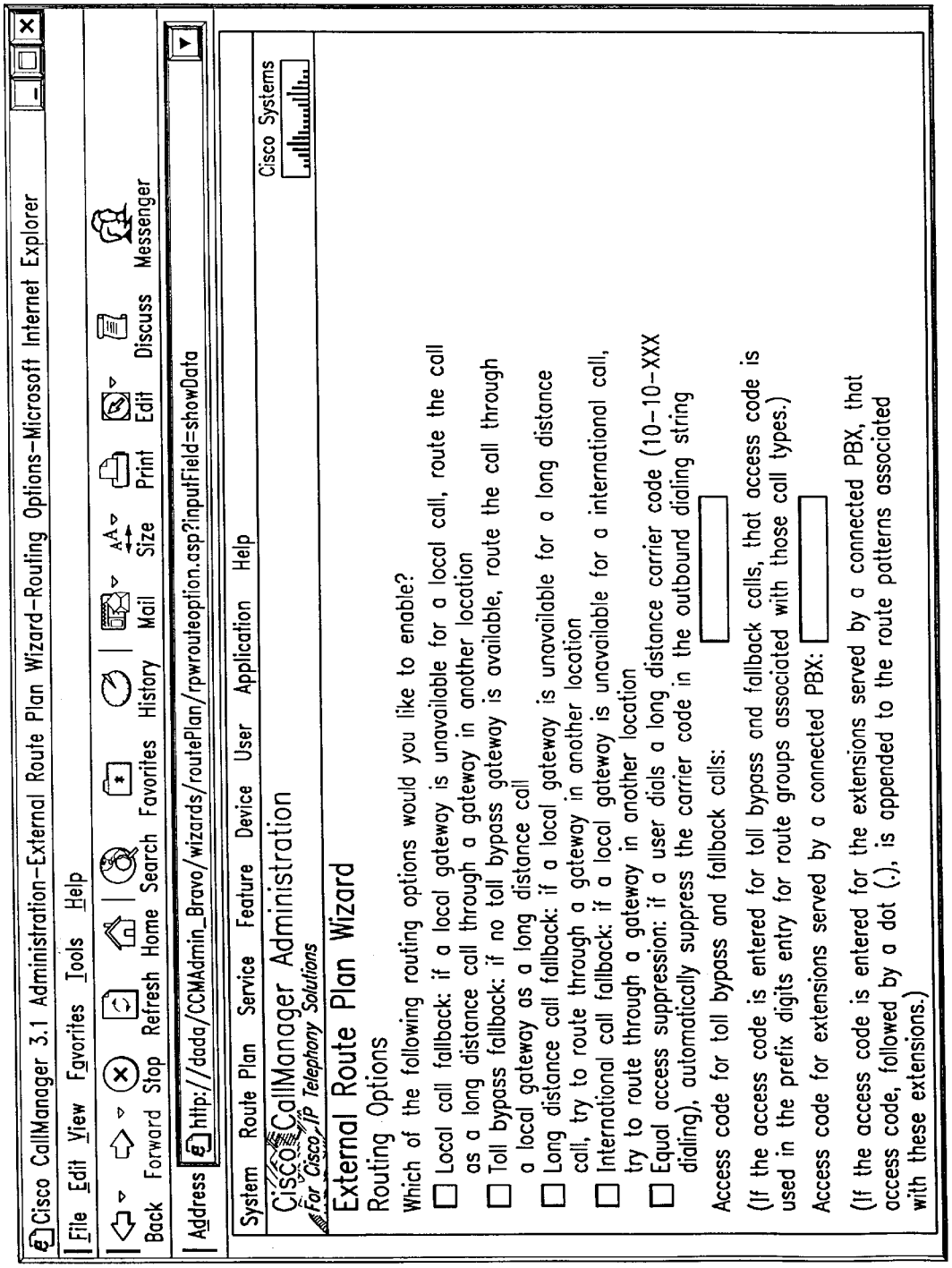
FIG. 2 illustrates an interface for presenting various routing options and receiving selections of these options.

FIGS. 2 through 7 illustrate exemplary interfaces presented by route plan wizard 32 for eliciting information for use in automatically generating route plans 30. However, although described and illustrated using various interfaces, system 10 and call manager 12 contemplate providing one or more graphical user interfaces using any form, technique, or operation to accomplish the underlying functions and processes illustrated. FIG. 2 illustrates an interface, indicated generally at 40, for presenting routing options and receiving selections and associated information for these routing options. In the example illustrated, the routing options include local call fallback, toll bypass fallback, long distance call fallback, international call fallback, and equal access suppression. As described by the text in interface 40, local call fallback, when enabled, permits call manager 12 to route a call placed to a local number through a remote gateway 20 as a long distance call if no local gateways 20 are available. For example, if device 14 in Dallas dials a local external number yet call manager 12 determines that no gateways 20 are available in Dallas, call manager 12 may route the call through IP network 16 to an available gateway 20 in San Jose, with the call then taking place as a long distance telephone call from San Jose across PSTN 18 to the external number in Dallas.

If toll bypass fallback is enabled, call manager 12 may route long distance telephone calls as a long distance call through PSTN 18 if no gateways 20 are available in the destination area code to route the call as a local telephone call. For example, consider a telephone call placed from device 14 in Dallas to an external number in San Jose. To minimize long distance charges, call manager 12 preferably routes the call through IP network 16 to gateway 20 in San Jose, with the call then proceeding as a local telephone call in San Jose. However, with toll bypass fallback enabled, if gateways 20 are not available in San Jose, call manager 12 may route the call through other available gateways 20 into PSTN 18 as a long distance telephone call.

Long distance call fallback, when enabled, allows call manager 12 to route a long distance telephone call as a long distance telephone call from any available gateway 20. For example, consider a long distance telephone call placed from device 14 in Dallas to a number in New York, where gateways 20 in Dallas are currently unavailable. Upon determining that no gateways 20 in Dallas are available, call manager 12 may route the call through IP network 16 to available gateways 20 in San Jose to place the long distance call from San Jose to New York. Similarly, international call fallback, when enabled, permits call manager 12 to route international calls into PSTN 18 using any available gateways 20.

When equal access suppression is enabled, call manager 12 automatically suppresses any carrier codes dialed by managed devices 14. This prevents users from bypassing the default long distance carrier and selecting an alternate carrier. Interface 40 also allows an administrator to provide access codes for toll bypass and fallback calls and an access code, such as the digit nine, for extensions served by a connected PBX.

Figure 3:
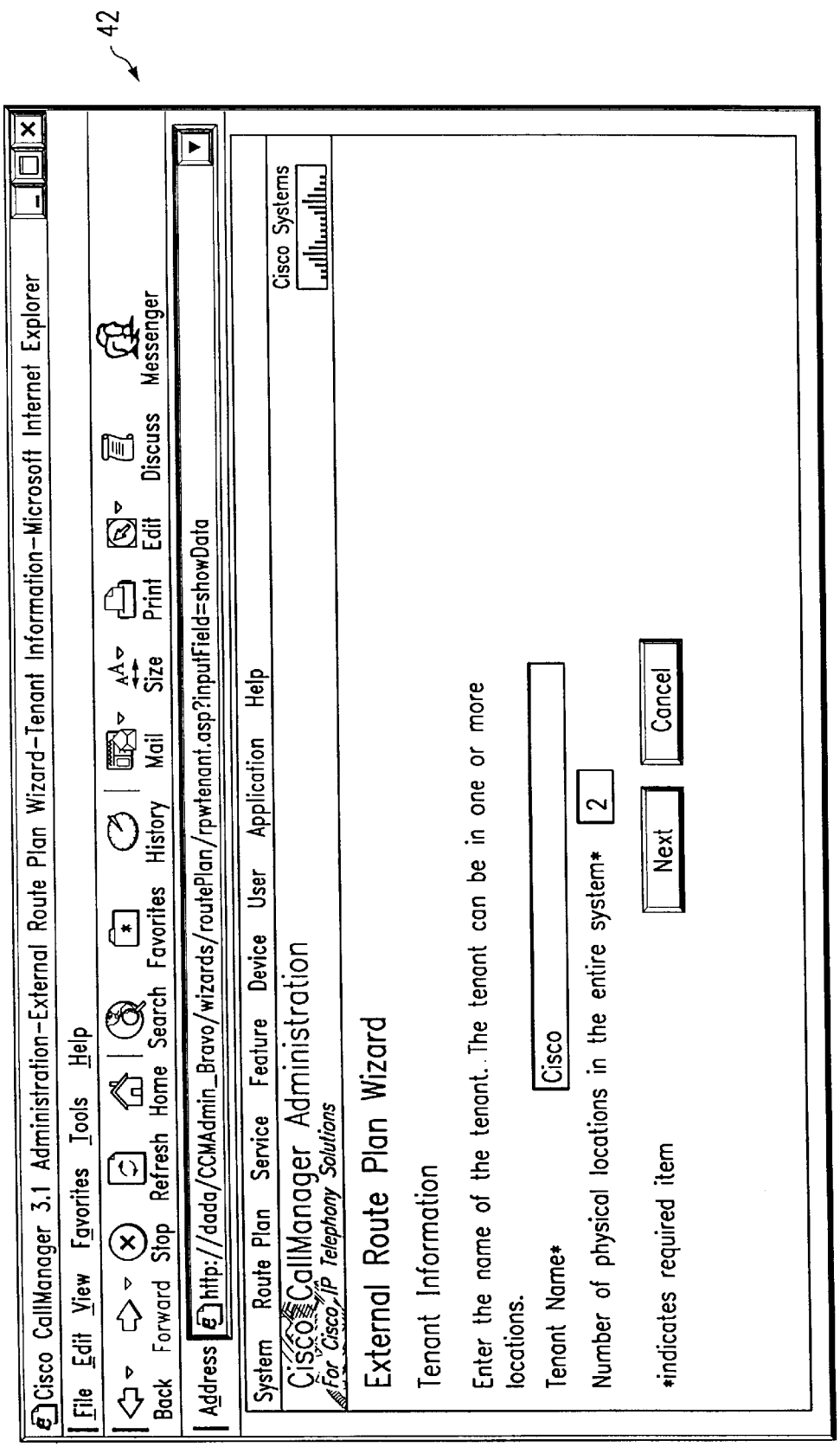
FIG. 3 is an illustration of an interface for obtaining tenant information.

FIG. 3 illustrates an interface, indicated generally at 42, for receiving tenant information for a tenant managed by call manager 12. Tenants may be any group or sub-groups of managed and/or accessible telephony equipment, such as routers, gateways, and voice over Internet protocol (VoIP) enable communications devices. In the example illustrated, tenant information includes a name for the tenant as well as the number of physical locations for the tenant. Route plan wizard 32 then elicits information for each of the physical locations indicated for the tenant.

FIG. 4 illustrates an interface, indicated generally at 44, for receiving location information for the various physical locations of the tenant. In the example illustrated, this location information includes a name for the location, local area codes for the location, a main switchboard number for the location, and digit dialing requirements. The digit dialing requirements specify the number of digits that must be dialed for local calls in a given location. For example, in Dallas and San Jose, current local requirements dictate that ten digits must be dialed for local telephone calls. However, interface 44 allows an administrator to specify the digit dialing requirements based upon the current requirements for the location, for example, by specifying ten digit dialing, seven digit dialing, or metro dialing.

Figure 5:
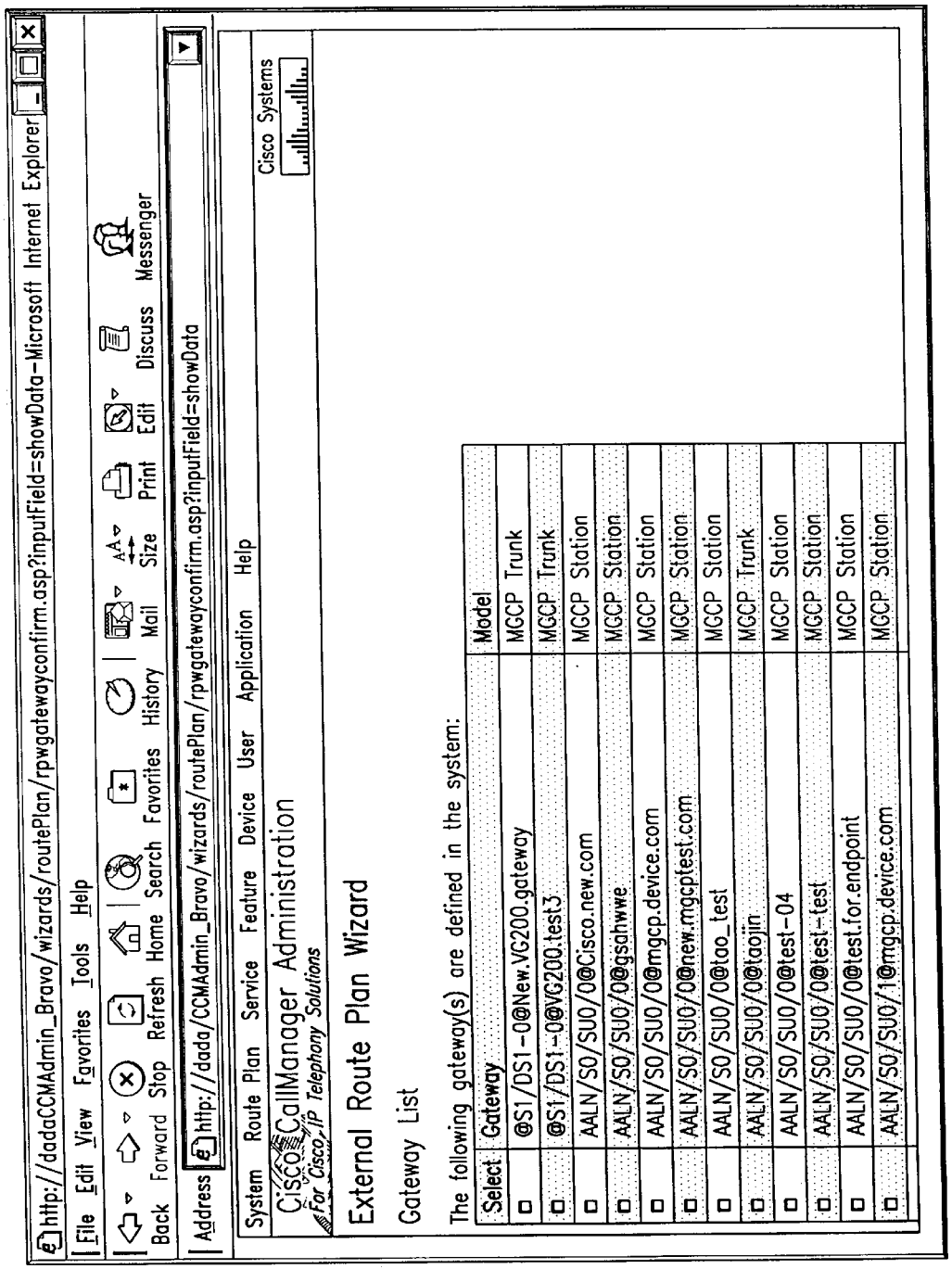
FIG. 5 illustrates an interface for presenting available gateways and receiving selections of these gateways.

FIG. 5 illustrates an interface, indicated generally at 46, that presents a list of available gateways for inclusion within the generated route plan. To determine the available gateways for presentation in interface 46, route plan wizard 32 accesses configuration data 34, which indicates available gateways 20 for routing information between IP network 16, PSTN 18, and other communication networks. Using interface 46, an administrator selects some or all of the presented gateways 20 for inclusion in the generated route plan. Upon receiving selections of particular gateways 20, route plan wizard 32 elicits information from the administrator for each of the selected gateways 20.

Figure 6:
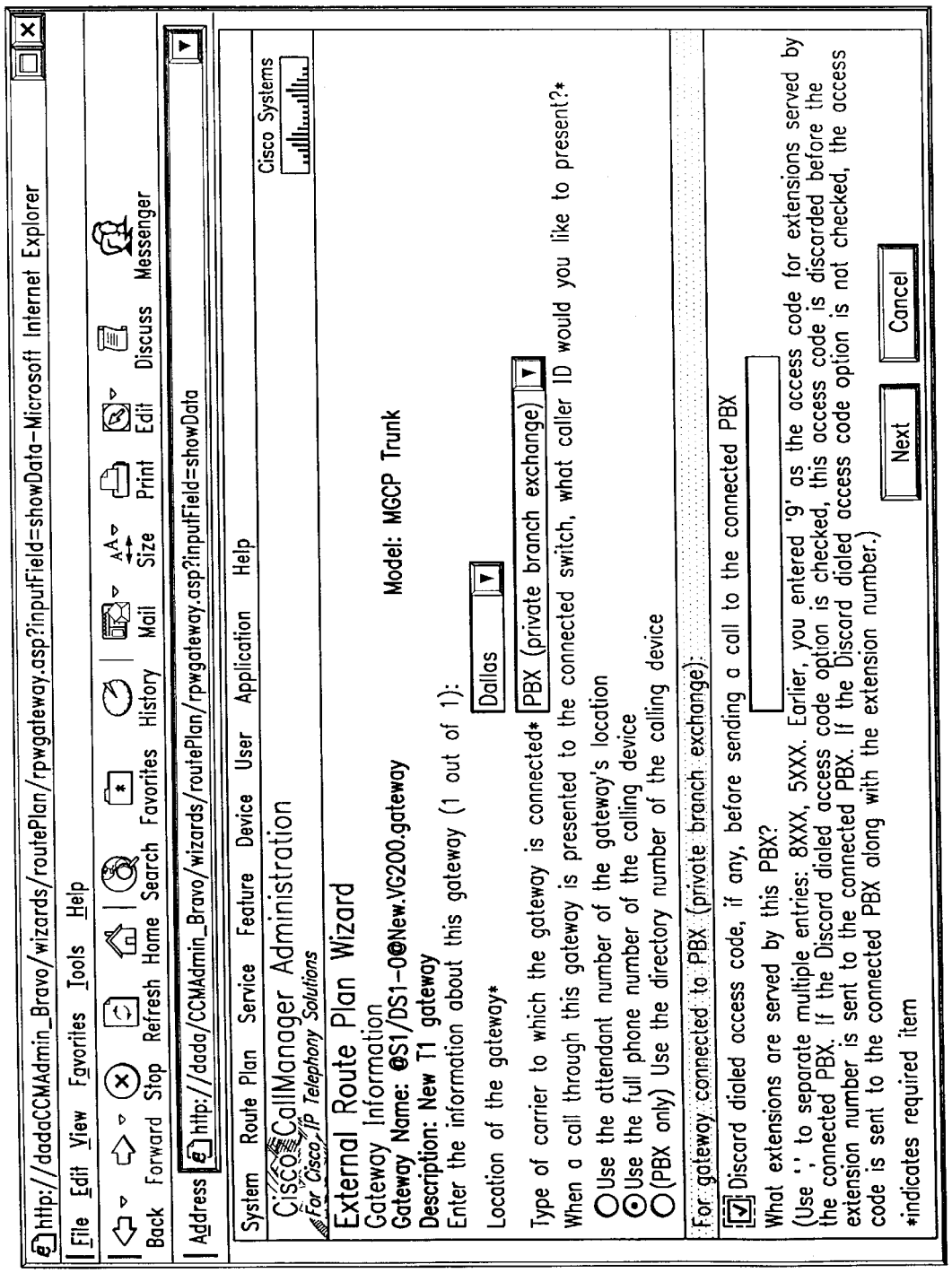
FIG. 6 illustrates an interface for obtaining information on a selected gateway.

FIG. 6 illustrates an interface, indicated generally at 48, presented by route plan wizard 32 for receiving gateway information for one of the gateways 20 selected for inclusion in the generated route plan. In the example illustrated by interface 48, this gateway information includes a location, carrier connection type, calling party identification options, and, if necessary, PBX options. The location for gateway 20 specifies one of the physical locations of the tenant. Thus, in the embodiment illustrated, each selected gateway 20 resides in or is associated with one of the physical locations of the tenant.

The carrier connection type indicates the type of network to which gateway 20 couples. For example, gateways 20 may couple between IP network 16 and PBX 26, LEC 22, IXC 24, and/or any other suitable communications network. This carrier connection type permits route plan wizard 32 to appropriately configure the generated route plan, since different called digits may be required based on the network to which gateway 20 couples. For example, PBX 26 may expect calls to external numbers to have a preceding access code, such as the digit nine. Similarly, for long distance telephone calls, LEC 22 may expect a preceding long distance access code before a phone number, such as the digit one. However, route plan wizard 32 may present options for any appropriate carrier connections and use the selected carrier connection type to appropriately configure the generated route plan based on dialing requirements for the carrier type coupled to gateway 20.

In addition to presenting fields for specifying the location of gateway 20 and the carrier connection type for gateway 20, interface 48 also presents calling party identification options. These options allow an administrator to select the caller identification number presented by calls passing through this gateway 20.

After receiving routing options, tenant information, selected gateways 20, and gateway information for these selected gateways 20, route plan wizard 32 generates route plan 30 that supports the routing of telephone calls within the tenant and to external locations. Using the generated route plan 30, an administrator may assign calling search bases from route plan 30 to phones, gateways, device pools, and other managed elements within the tenant.

Figure 7A:
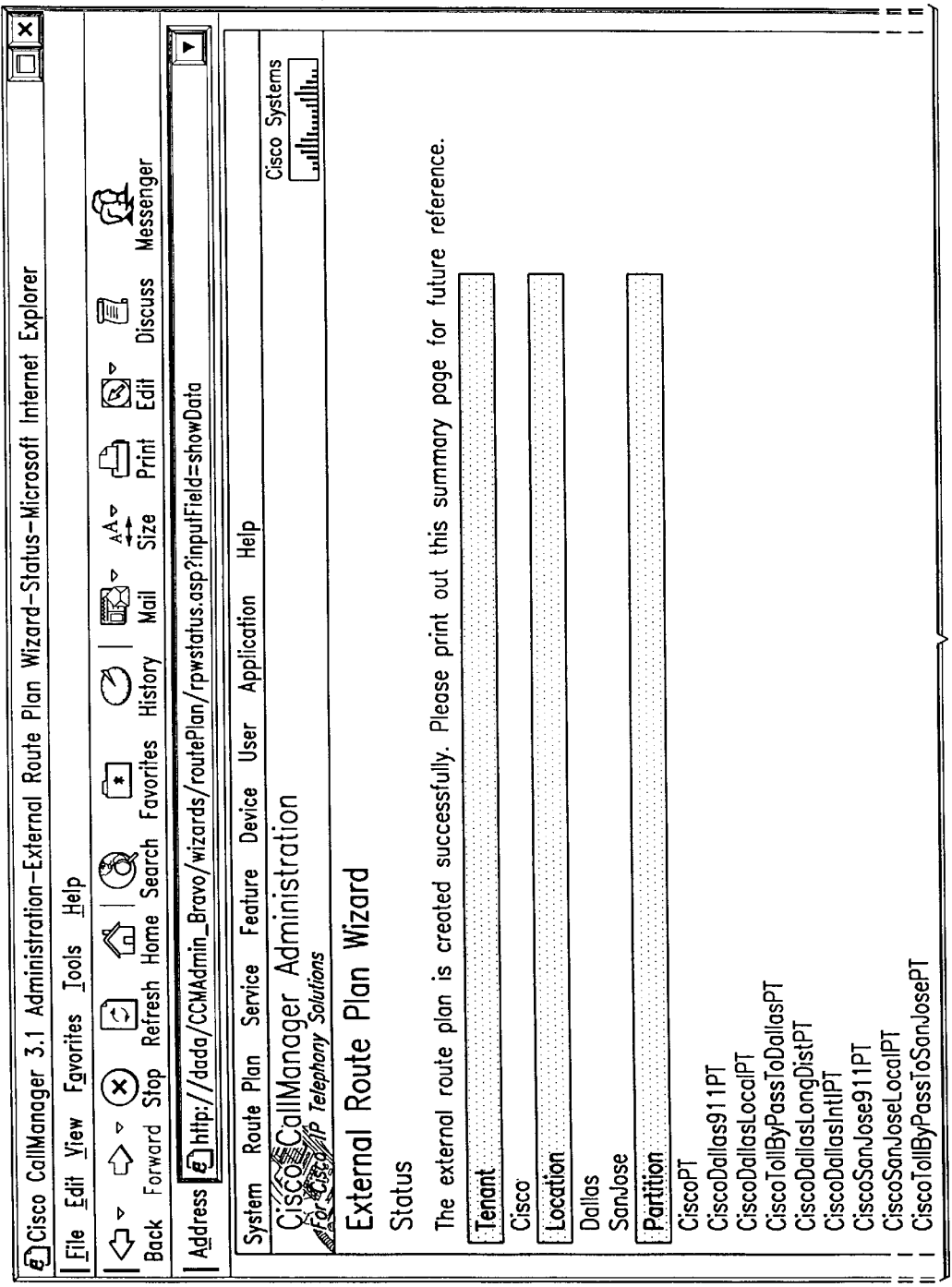
FIG. 7 illustrates an interface for presenting results of the automated route plan generation.

FIG. 7 illustrates an interface, indicated generally at 50, that presents a summary of route plan 30 generated based on the received routing options, location information, and gateway information. As illustrated, this summary includes in identification of the tenant and its locations and further presents the generated partitions, calling search spaces, route lists and associated route filters, a route group for the single gateway 20 in this example, and the route groups assigned to particular route lists. As illustrated by this example, even an organization with only two physical locations and a single gateway may require a fairly complex route plan 30. With the addition of locations and gateways 20, the resulting route plans will quickly become much larger and more complex. Thus, the ability for route plan wizard 32 to automatically generate route plan 30 through a series of relatively simple policy and configuration questions provides a great advantage over other configuration techniques.

However, while the preceding description and the associated figures detail specific interfaces presenting fields to elicit specific information in a particular order, system 10 contemplates route wizard 32 presenting interfaces having any appropriate configuration in any suitable order for obtaining data for use in automatically generating route plans 30. Moreover, while the preceding description focuses on the use of route wizard 32 within call manager 12, system 10 contemplates any suitable device executing and/or providing the functionality of route wizard 32 to generate route plans 30 for use by one or more call managers 12.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for generating a route plan comprising:
   receiving routing options for a tenant having a plurality of physical locations;
   for each of the physical locations, receiving location information, the location information comprising at least one area code and digit dialing requirements;
   presenting a plurality of predefined gateways;
   receiving selections indicating one or more of the gateways;
   for each of the selected gateways, receiving gateway information, the gateway information comprising a carrier connection type and a location indicating a selected one of the physical locations; and generating a route plan based on the routing options, the location information, and the gateway information, the route plan supporting the routing of telephone calls from managed devices of the tenant.

2. The method of claim 1, wherein the route plan comprises a plurality of route groups, a plurality of route lists each comprising at least one of the route groups, and a plurality of route patterns each indicating routing of a matching number to a selected one of the route groups and route lists.

3. The method of claim 1, wherein the routing options comprise selections chosen from the group of local call fallback, toll bypass fallback, long distance call fallback, and international call fallback.

4. The method of claims 1, wherein the digit dialing requirements are a selected one of ten-digit dialing, seven-digit dialing, and metro dialing.

5. The method of claim 1, further comprising accessing a network configuration database to identify the gateways.

6. The method of claim 1, wherein the carrier connection type for the gateway information of each of the gateways is a selected one of local exchange carrier, inter-exchange carrier, and private branch exchange.

7. The method of claim 6, further comprising, for each of the gateways, if the carrier connection type is a private branch exchange, receiving an indication whether to discard an access code for calls sent to the private branch exchange.

8. An apparatus for generating a route plan comprising:

a memory storing network configuration data, the network configuration data describing a plurality of gateways;

a user interface operable to present routing options for a tenant having a plurality of physical locations, to receive selected ones of the routing options, to receive location information for each of the physical locations, the location information comprising at least one area code and digit dialing requirements, to present a plurality of predefined gateways, to receive selections indicating one or more of the gateways, and, for each of the selected gateways, to receive gateway information, the gateway information comprising a carrier connection type and a location indicating a selected one of the physical locations; and a route generation module operable to generate a route plan based on the selected routing options, the location information, and the gateway information, the route plan supporting the routing of telephone calls from managed devices of the tenant.

9. The apparatus of claim 8, wherein the route plan comprises a plurality of route groups, a plurality of route lists each comprising at least one of the route groups, and a plurality of route patterns each indicating routing of a matching number to a selected one of the route groups and route lists.

10. The apparatus of claim 8, wherein the routing options comprise local call fallback, toll bypass fallback, long distance call fallback, and international call fallback.

11. The apparatus of claims 8, wherein the digit dialing requirements are a selected one of ten-digit dialing, seven-digit dialing, and metro dialing.

12. The apparatus of claim 8, further comprising accessing a network configuration database to identify the gateways.

13. The apparatus of claim 8, wherein the carrier connection type for the gateway information of each of the gateways is a selected one of local exchange carrier, inter-exchange carrier, and private branch exchange.

14. The apparatus of claim 13, further comprising, for each of the gateways, if the carrier connection type is a private branch exchange, receiving an indication whether to discard an access code for calls sent to the private branch exchange.

15. Logic for generating a route plan, the logic encoded in media and operable when executed to:

receive routing options for a tenant having a plurality of physical locations;

for each of the physical locations, receive location information, the location information comprising at least one area code and digit dialing requirements;

present a plurality of predefined gateways;

receive selections indicating one or more of the gateways;

for each of the selected gateways, receive gateway information, the gateway information comprising a carrier connection type and a location indicating a selected one of the physical locations; and generate a route plan based on the routing options, the location information, and the gateway information, the route plan supporting the routing of telephone calls from managed devices of the tenant.

16. The logic of claim 15, wherein the route plan comprises a plurality of route groups, a plurality of route lists each comprising at least one of the route groups, and a plurality of route patterns each indicating routing of a matching number to a selected one of the route groups and route lists.

17. The logic of claim 15, wherein the routing options comprise selections chosen from the group of local call fallback, toll bypass fallback, long distance call fallback, and international call fallback.

18. The logic of claims 15, wherein the digit dialing requirements are a selected one of ten-digit dialing, seven-digit dialing, and metro dialing.

19. The logic of claim 15, further operable to access a network configuration database to identify the gateways.

20. The logic of claim 15, wherein the carrier connection type for the gateway information of each of the gateways is a selected one of local exchange carrier, inter-exchange carrier, and private branch exchange.

21. The logic of claim 20, further operable, for each of the gateways, if the carrier connection type is a private branch exchange, to receive an indication whether to discard an access code for calls sent to the private branch exchange.

22. An apparatus for generating a route plan comprising:

means for receiving routing options for a tenant having a plurality of physical locations;

means for, for each of the physical locations, receiving location information, the location information comprising at least one area code and digit dialing requirements;

means for presenting a plurality of predefined gateways;

means for receiving selections indicating one or more of the gateways;

means for, for each of the selected gateways, receiving gateway information, the gateway information comprising a carrier connection type and a location indicating a selected one of the physical locations; and means for generating a route plan based on the routing options, the location information, and the gateway information, the route plan supporting the routing of telephone calls from managed devices of the tenant.

* * * * *

UNITED STATES PATENT AND TRADEMARK OFFICE
CERTIFICATE OF CORRECTION

PATENT NO. : 6,704,406 B1
DATED : March 9, 2004
INVENTOR(S) : Pearce et al.

It is certified that error appears in the above-identified patent and that said Letters Patent is hereby corrected as shown below:

Column 7,
Lines 17 and 57, after "of" delete "claims" and insert -- claim --.

Column 8,
Line 34, after "of" delete "claims" and insert -- claim --.

Signed and Sealed this

Thirty-first Day of August, 2004

JON W. DUDAS
*Director of the United States Patent and Trademark Office*